R. H. JOHNSON.
REVERSIBLE GEARING.
APPLICATION FILED DEC. 21, 1912.

1,062,469.

Patented May 20, 1913.

3 SHEETS—SHEET 1.

Witnesses
Byron B. Collings.
Edwin J. Beller.

Inventor
Robert H. Johnson,
by Wilkinson, Witherspoon & MacKay,
Attorneys.

R. H. JOHNSON.
REVERSIBLE GEARING.
APPLICATION FILED DEC. 21, 1912.

1,062,469.

Patented May 20, 1913.

3 SHEETS—SHEET 2.

Witnesses
Byron B. Collings.
Edwin J Beller.

Inventor
Robert H. Johnson,
by Wilkinson, Witherspoon & MacKaye
Attorneys

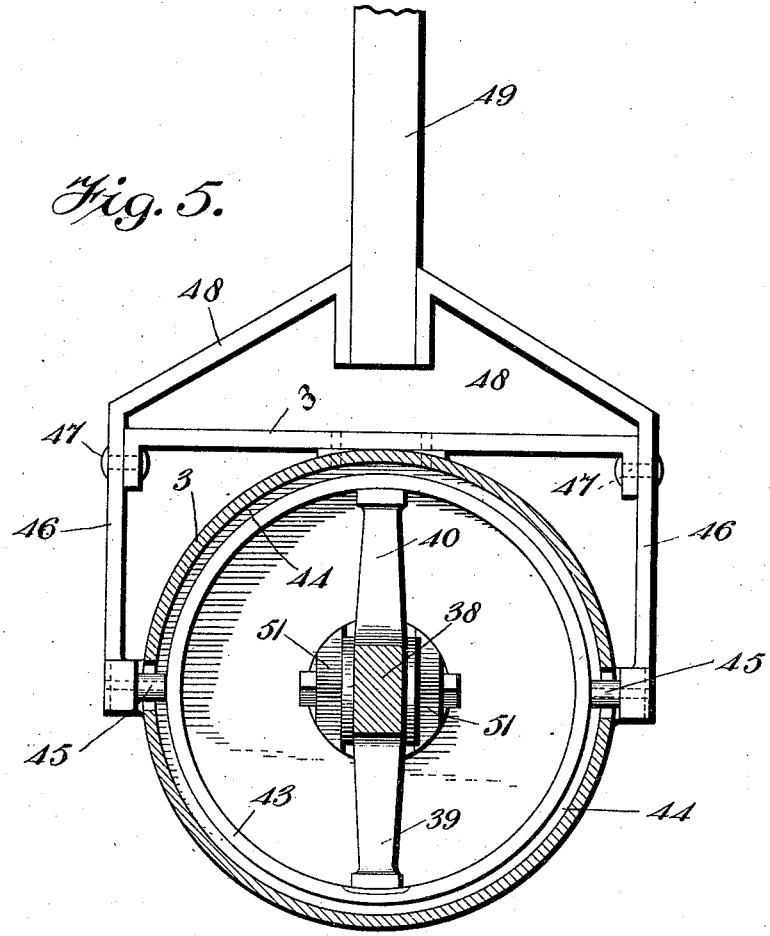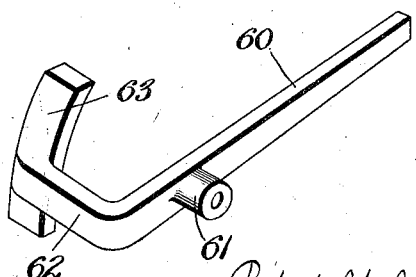

UNITED STATES PATENT OFFICE.

ROBERT HENRY JOHNSON, OF WASHINGTON, DISTRICT OF COLUMBIA.

REVERSIBLE GEARING.

1,062,469.  Specification of Letters Patent.  Patented May 20, 1913.

Application filed December 21, 1912. Serial No. 738,108.

*To all whom it may concern:*

Be it known that I, ROBERT H. JOHNSON, a citizen of the United States, residing at Washington, in the District of Columbia, have invented certain new and useful Improvements in Reversible Gearing; and I do hereby declare the following to be a full, clear, and exact description of the invention, such as will enable others skilled in the art to which it appertains to make and use the same.

My present invention relates to mechanism for transmitting motion in reverse directions from a drive shaft to a driven shaft, and it relates more especially to reversible driving mechanism, which may be used to connect the driving shaft to the driven shaft for turning the latter in either direction, but without reversing the driving shaft; and also for turning the driven shaft at substantially the same rate of speed in either direction, or to permit the same to remain without turning.

My invention is especially adapted for use in connecting the propeller shaft of a motor engine to the driving shaft, and for use in various other relations, where it is desired to drive the driven shaft in reverse directions at high speeds, or to prevent the driven shaft from rotating without stopping the engine.

My invention will be understood by reference to the accompanying drawings, in which the same parts are indicated by the same numerals throughout the several views.

Figure 1:
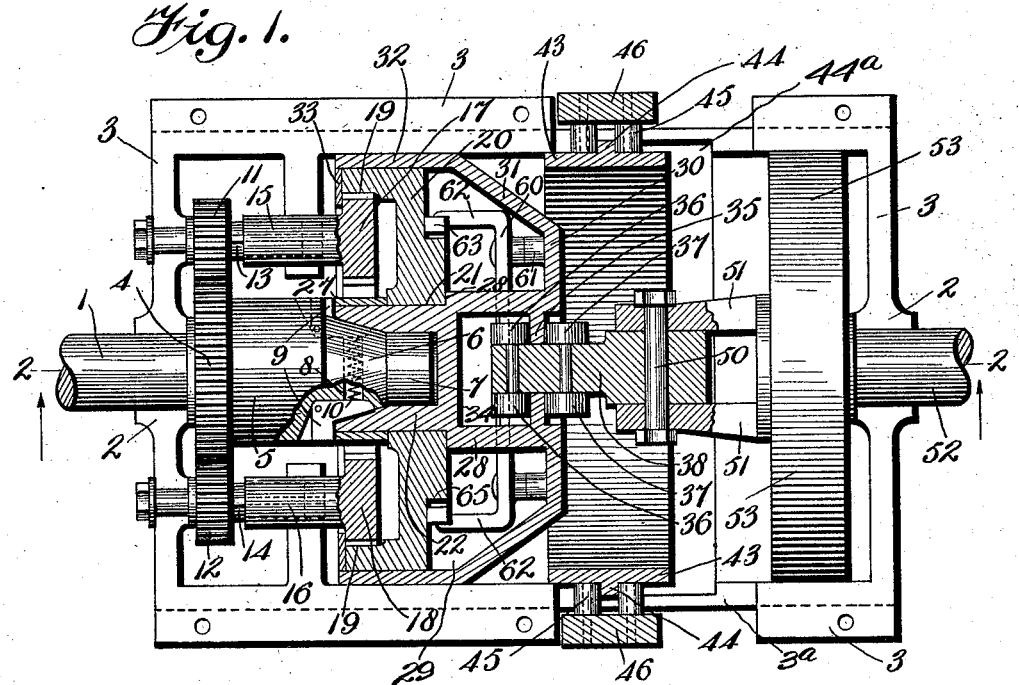
Figure 2:
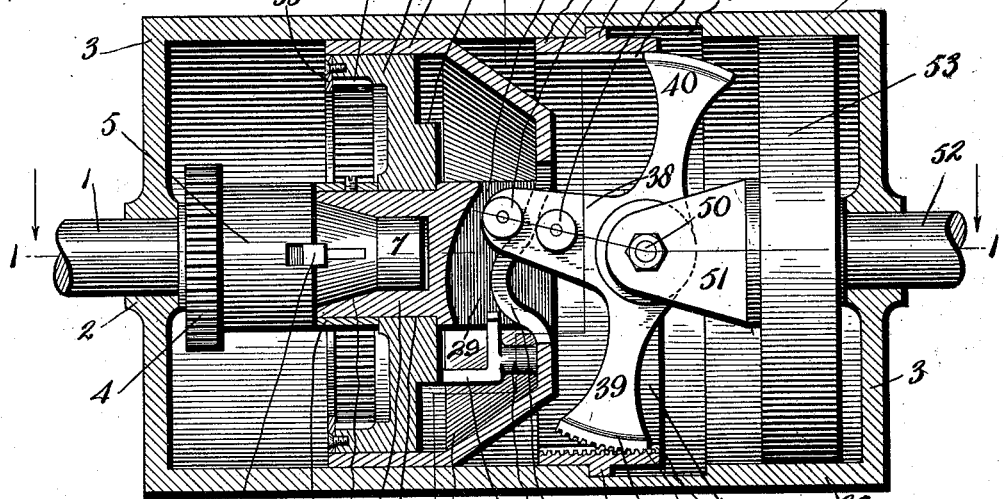
Figure 3:
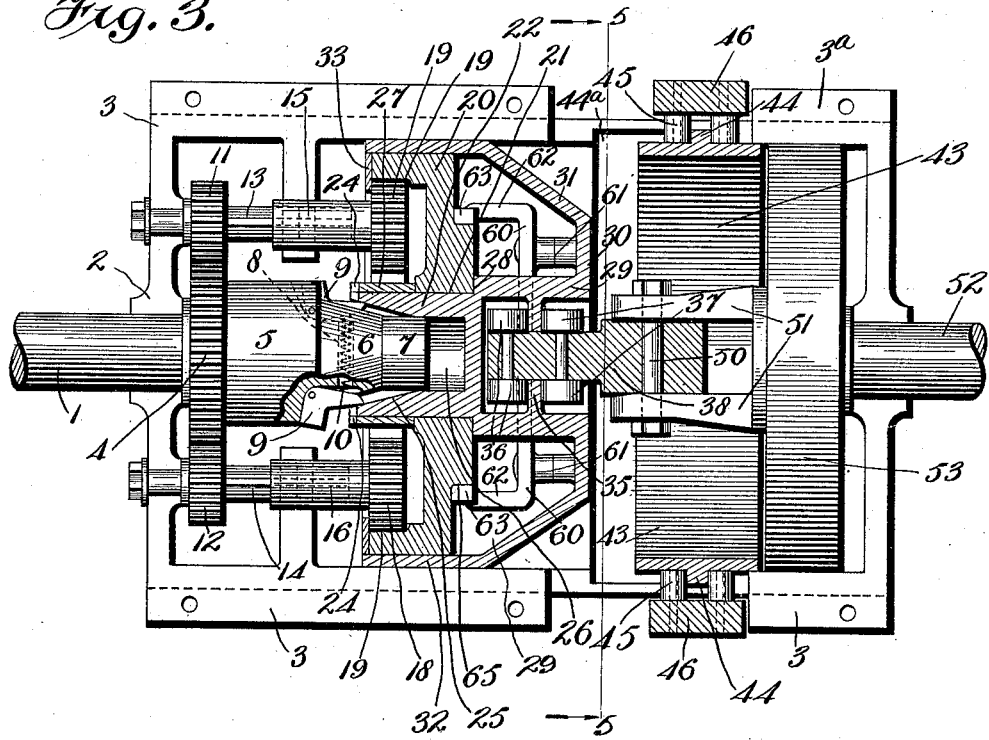
Figure 4:
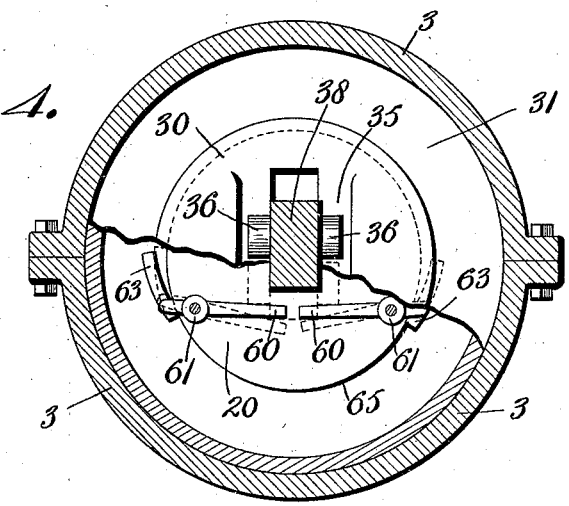

Figure 1 shows a central horizontal section through the apparatus, parts being shown in elevation, and parts being broken away, the said section being along the line 1—1 of Fig. 2, and looking down. Fig. 2 shows a vertical section along the line 2—2 of Fig. 1, and looking in the direction of the arrows, parts being shown in elevation, and parts being broken away. In Figs. 1 and 2, the clutch mechanism is in the position for going ahead. Fig. 3 is a similar view to Fig. 1, except that the clutch mechanism is in the position for reversing the driven shaft. Fig. 4 shows a section along the broken line 4—4 of Fig. 2, and looking in the direction of the arrows. Fig. 5 shows a section along the line 5—5 of Fig. 3, and looking in the direction of the arrows, and shows the lever arrangement for reversing the parts by hand. Fig. 6 is a detail, showing in perspective, and on a larger scale, one of the brake levers and brake shoes thrown into action when reversing the driven shaft.

1 represents the driving shaft, journaled in bearings 2 in the frame 3, and driven by any source of power, such as an internal combustion engine. This shaft carries the gear wheel 4, also the cylindrical hub 5, which is tapered, as at 6, and terminates in the cylindrical end 7, which is preferably of the same diameter as the shaft 1 or may be the end thereof. The tapered portion 6 is perforated, as at 8, to receive the spring 10, which presses outward on the inner arm of the dogs 9, which are in the form of bell crank levers, pivoted in the hub 5, as shown most clearly in Figs. 1 and 3.

The gear wheel 4 is fast on the shaft 1, and meshes with the pinions 11 and 12 on the counter shafts 13 and 14, which counter shafts are splined into sleeves 15 and 16, which sleeves form hollow shafts for the pinions 17 and 18, respectively; and these pinions mesh in the internal teeth 19 of the gear wheel 20, which is revolubly mounted on the portion 21 of the hub 22 of the cap-shaped sliding clutch member, said internal gear wheel being held between the ring 27, fast on said clutch member and the shoulder 28. The clutch member has a recess, internally tapered as at 25 and hollowed as at 26; and the ring 27 and the forward end of the tapered portion are notched, as at 24, to engage the dogs 9, when the parts are in the position for going ahead, as shown in Figs. 1 and 2. When in this position, the sloping face 25 wedges the inner arms of the dogs inward against the action of the spring 10, and causes said dogs to lock in the notches 24, as shown.

The cap-shaped clutch member is recessed in its rear, as at 29, and is provided with a flat rear face 30, connecting the hollow hub of said member with the cone portion 31 thereof, beyond which is the hollow cylindrical portion 32, forming a housing for the gear wheel 20; and a ring 33 engages in front of the gears 17 and 18, to prevent them from being drawn out of engagement with the teeth 19. The rear portion of the clutch member is recessed, as at 34, in front of the cam rib 35, on either side of which rib are the anti-friction rollers 36 and 37, journaled on the arm 38 of the T-lever, which has arms 39 and 40, the arm 40 being merely used as a counter-weight, and having no positive function in the apparatus. The arm 39 is provided with the segmental rack 41, engaging the rack 42 in the sliding ring 43, which sliding ring has an annular rib 44, traveling in the annular groove 44ª in the cylindrical portion 3ª of the frame 3, as shown most clearly in Fig. 2. On either side of this annular rib 44, are the anti-friction rollers 45, carried by the levers 46, which are pivoted, as at 47, to the frame 3, as shown most clearly in Fig. 5; and these levers 46 are connected by the yoke 48 to the hand lever 49 (see Fig. 5), so that the ring 43 may be moved axially by means of said hand lever 49. The ring 43 rotates with the driven shaft, due to the engagement of the arms 39 and 40, which project into axial grooves 43ª therein; and it serves not only as a means for rocking the bell crank lever 38, 39, irrespective of the velocity of rotation of the driven shaft, but it also serves as an auxiliary fly wheel for said shaft.

The anti-friction rollers 36 and 37 are journaled on the arm 38, hinged, as by means of the bolt 50, to the yoke 51, carried by the driven shaft 52, on which driven shaft a suitable fly wheel 53 may be provided. The yoke 51 is rigidly attached to the driven shaft 52; and said yoke 51, driven shaft 52, and hinged arm 38 rotate together, as will be obvious upon inspecting Figs. 1 and 2.

Pivoted in the chamber 29 of the sliding clutch member, are brake levers and shoes, shown most clearly in Figs. 4 and 6. These brake levers have arms 60, and are pivoted, as at 61, to the clutch member, and are bent over, as at 62, terminating in the brake shoes 63, which engage the cylindrical surface 65 on the back of the gear wheel 20, when the parts are in the position for reversing, as shown most clearly in Fig. 3.

The operation of the device is as follows:—The driving shaft 1 being continuously in rotation, and the ring 43 being moved by the hand lever 49 to the position shown in Figs. 1 and 2, the roller 37 will engage the cam plate 35, forcing it forward until the tapered face 25 of the clutch member will cause the dogs to swing against the action of the spring 10, until they engage in the notches 24, thus locking the clutch member to the driving shaft. Motion will then be transmitted from the driving shaft 1 to the clutch member, from it to the hinged arm 38, and the yoke 51, to the driven shaft 52. This is preferably the position for going ahead on the driven shaft.

By moving the ring 43 to the right from the position shown in Fig. 2, the rollers 36 ride up on the cam plate 35, drawing the clutch member backward, and disengaging the dogs 9, at which time, the driving shaft 1, gear wheel 4, pinions 11, 12, 17, and 18, and the gear wheel 20 will all rotate idly, without turning the driven shaft. A further movement of the ring 43 to the position shown in Fig. 3, will cause the rollers 36 to strike the clutch levers 60, throwing the shoes 63 into engagement with the cylindrical surface 65 of the internal gear wheel 20; and by means of the friction of said shoes, the clutch member will be connected to the gear wheel 20, and the driven shaft 52 will be rotated in the reverse direction.

It will thus be seen that I provide a positive lock, by means of the dogs 9 coupling together the driving shaft and the clutch member, when the parts are in the position for going ahead; while in reversing, the driving and driven shafts are connected together by friction shoes, which will lessen the shock of reversal, as said shoes will give when the engine is suddenly reversed.

It will be obvious that various modifications might be made in the herein described apparatus, and in the construction, combination, and arrangement of parts, which could be used without departing from the spirit of my invention.

Having thus described my invention, what I claim and desire to secure by Letters Patent of the United States is:—

1. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear, and a hinged connection between said clutch member and said driven shaft, substantially as described.

2. Mechanism for transmitting rotary motion comprising a drive shaft, a driven shaft, an intermediate clutch member, an internal gear revolubly mounted in said clutch member, gearing connecting the drive shaft and said internal gear, spring-operated hinged dogs for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear, and a hinged connection between said clutch member and said driven shaft, substantially as described.

3. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a hinged connection between said clutch member and said driven shaft comprising a lever hinged to the driven shaft, and a cam plate on said clutch member with means for swinging said lever and thus moving said clutch member axially, substantially as described.

4. Mechanism for transmitting rotary motion comprising a drive shaft, a driven shaft, an intermediate clutch member, an internal gear revolubly mounted in said clutch member, gearing connecting the drive shaft and said internal gear, spring-operated hinged dogs for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a hinged connection between said clutch member and said driven shaft comprising a lever hinged to the driven shaft, and a cam plate on said clutch member with means for swinging said lever and thus moving said clutch member axially, substantially as described.

5. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, said means comprising pivoted dogs carried by the drive shaft, and a spring interposed between opposite pairs of dogs, means for moving said clutch member axially in both directions, means operated during the reverse movement of said clutch member for connecting said member and said internal gear, and a hinged connection between said clutch member and said driven shaft, substantially as described.

6. Mechanism for transmitting rotary motion comprising a drive shaft, a driven shaft, an intermediate clutch member, an internal gear revolubly mounted in said clutch member, gearing connecting the drive shaft and said internal gear, a hub on said drive shaft, spring-operated hinged dogs carried by said hub for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear, and a hinged connection between said clutch member and said driven shaft, substantially as described.

7. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a hinged connection between said clutch member and said driven shaft comprising a bell crank lever having one arm hinged to the driven shaft, and a segmental rack on the other arm, a second rack engaging said segmental rack, a hand lever for moving said second rack, and a cam plate on said clutch member engaging one arm of said bell crank lever, substantially as described.

8. Mechanism for transmitting rotary motion comprising a drive shaft, a driven shaft, an intermediate clutch member, an internal gear revolubly mounted in said clutch member, gearing connecting the drive shaft and said internal gear, spring-operated hinged dogs for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a hinged connection between said clutch member and said driven shaft comprising a bell crank lever having one arm hinged to the driven shaft, and a segmental rack on the other arm, a second rack engaging said segmental rack, a hand lever for moving said second rack, and a cam plate on said clutch member engaging one arm of said bell crank lever, substantially as described.

9. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear comprising levers carried by said clutch member provided with shoes engaging said internal gear wheel, and a hinged connection between said clutch member and said driven shaft, substantially as described.

10. Mechanism for transmitting rotary motion comprising a drive shaft, a driven shaft, an intermediate clutch member, an internal gear revolubly mounted in said clutch member, gearing connecting the drive shaft and said internal gear, a hub on said drive shaft, means carried by said hub for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear comprising levers carried by said clutch member provided with shoes engaging said internal gear wheel, and a hinged connection between said clutch member and said driven shaft, substantially as described.

11. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a connection between said clutch member and said driven shaft, comprising a bell crank lever having one arm hinged to the driven shaft, and a segmental rack on the other arm, a ring engaging said bell crank lever and having an axial rack engaging said segmental rack, a hand lever for moving said second rack, and a cam plate on said clutch member engaging one arm of said bell crank lever, substantially as described.

12. Mechanism for transmitting rotary motion comprising a drive shaft, a driven shaft, an intermediate clutch member, an internal gear revolubly mounted in said clutch member, gearing connecting the drive shaft and said internal gear, spring-operated hinged dogs for locking the drive shaft to said clutch member when the latter is moved in one direction and for releasing the engagement between said drive shaft and said clutch member when the clutch member is moved in the reverse direction, means operated during the reverse movement of said clutch member for connecting said member and said internal gear, and a hinged connection between said clutch member and said driven shaft, comprising a T-shaped lever having one arm hinged to the driven shaft, and a segmental rack on a second arm, a ring provided with axial grooves to engage two of the arms of said bell crank lever, and an axial rack engaging said segmental rack, a hand lever for moving said second rack, and a cam plate on said clutch member engaging the third arm of said bell crank lever, substantially as described.

13. Mechanism for transmitting rotary motion comprising a drive shaft, a driven shaft, an intermediate clutch member, an internal gear revolubly mounted in said clutch member, gearing connecting the drive shaft and said internal gear, means for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear comprising brake levers carried by said clutch member provided with shoes engaging said internal gear wheel, and a connection between said clutch member and said driven shaft, comprising a bell crank lever having one arm hinged to the driven shaft, and a segmental rack on the other arm, a ring engaging said bell crank lever and having an axial rack engaging said segmental rack, a hand lever for moving said second rack, and a cam plate on said clutch member engaging one arm of said bell crank lever, substantially as described.

14. Mechanism for transmitting rotary motion comprising a drive shaft, a driven shaft, an intermediate clutch member, an internal gear revolubly mounted in said clutch member, gearing connecting the drive shaft and said internal gear, a hub on said drive shaft, means carried by said hub for locking the drive shaft to said clutch member when the latter is moved in one direction and for releasing the engagement between said drive shaft and said clutch member when the clutch member is moved in the reverse direction, means for moving said clutch member axially in both directions, means operated during the reverse movement of said clutch member for connecting said member and said internal gear comprising levers carried by said clutch member provided with shoes engaging said internal gear wheel, and a connection between said clutch member and said driven shaft, comprising a bell crank lever having one arm hinged to the driven shaft, and a segmental rack on the other arm, a ring engaging said bell crank lever and having an axial rack engaging said segmental rack, a hand lever for moving said second rack, and a cam plate on said clutch member engaging one arm of said bell crank lever, substantially as described.

In testimony whereof, I affix my signature in presence of two witnesses.

ROBERT HENRY JOHNSON.

Witnesses:
B. H. DAILEY,
H. T. McKEEVER.